United States Patent Office.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

PROCESS OF MAKING INDIGO COLORING-MATTERS.

SPECIFICATION forming part of Letters Patent No. 617,652, dated January 10, 1899.

Application filed December 17, 1897. Serial No. 662,306. (No specimens.)

*To all whom it may concern:*

Be it known that KARL HEUMANN, deceased, late of Zurich, Switzerland, did invent a new and useful Improvement in the Manufacture of Indigo Coloring-Matters, of which the following is a specification, and for which patents were obtained in the following countries: England, No. 8,726, dated June 5, 1890; Italy, XXI, 29,506, LVIII, 188, dated September 30, 1890; Germany, No. 63,310, dated March 10, 1891; France, No. 206,567, dated March 19, 1891; Belgium, No. 94,447, dated April 15, 1891; Spain, No. 11,937, dated April 25, 1891; Austria, No. 41/2,246, dated August 17, 1891; Hungary, XXV, 2,123, dated August 17, 1891, and Russia, No. 10,707, dated October 3, 1892.

In several applications for patent processes are described for the manufacture of indigo coloring-matters invented by the late Professor Karl Heumann, (see German Patents No. 54,626, of May 6, 1890; No. 58,276, of August 15, 1890; No. 61,712, of December 30, 1890, and No. 63,309, of March 10, 1890,) which consists in treating various glycocol derivatives with caustic soda or caustic potash at suitable temperatures and oxidizing the leuco compounds so obtained to convert them into the coloring-matters.

This invention consists of an improvement in the first part of the above-named process, whereby a better yield can be obtained. The improvement consists in using instead of caustic soda or caustic potash alone or mixed with one another either or both of these alkalies admixed with quicklime.

In all the processes above referred to this inventor has found that it is advantageous to add fresh quicklime to the caustic alkali used in the melt, the beneficial effect being that a higher yield of the leuco compound, and consequently of the indigo coloring-matter, is in each case obtained.

The following example will serve to show how this invention is carried into effect in practice:

Mix together one hundred parts of ortho-tolyl-glycocol, four hundred and fifty parts of caustic potash, (or of a mixture of equal parts of caustic potash and caustic soda,) and one hundred and thirty parts finely-powdered fresh quicklime. Heat these, while stirring quickly, to 270° centigrade, excluding the air as far as possible, raise the temperature within about ten minutes from 270° to 300° centigrade, allow the melt to cool, dissolve in water, preventing contact with the air as far as conveniently possible, filter till free from lime and pass a stream of air through the solution until no further precipitate of the coloring-matter takes place, filter, wash with water, with a little hydrochloric acid, and finally again with water, and dry. This addition of quicklime to the melt can be made in all cases without regard to the glycocol used. The quantity of quicklime is so chosen that a melt which is not too thick to be readily stirred is obtained.

What is claimed is—

The improvement in the process of manufacturing indigo coloring-matters from glycocol derivatives, consisting in adding quicklime to the caustic alkaline melt, in which the glycocol derivatives are treated, substantially as described.

LIVINGSTON GIFFORD,
*Administrator of the estate of Karl Heumann, deceased.*

Witnesses:
M. WILSON,
J. E. GREER.